United States Patent Office 2,880,951
Patented Apr. 7, 1959

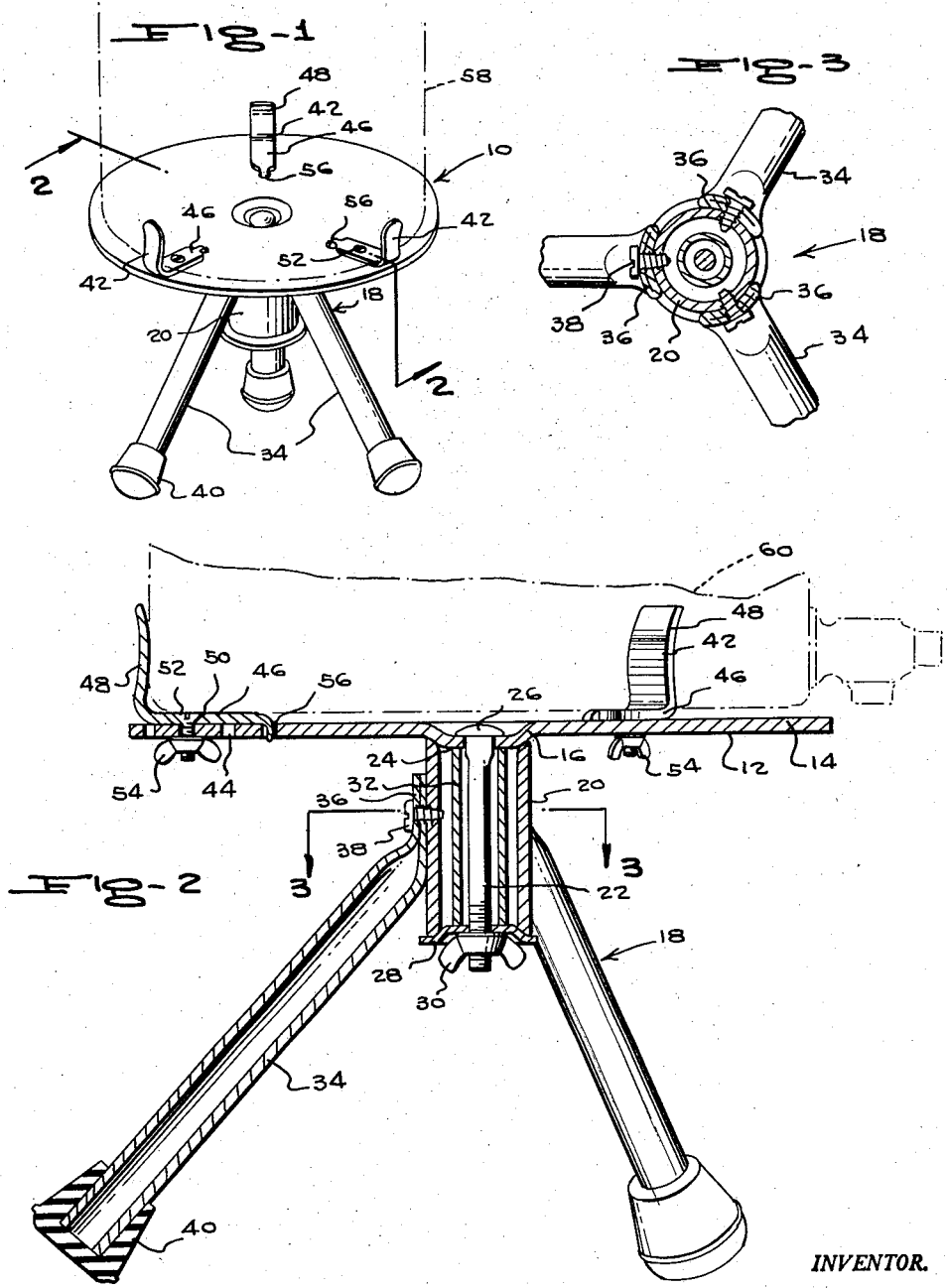

2,880,951

ROTATABLE DISPENSING SUPPORT FOR BEVERAGE CONTAINERS

William H. Springer, Lancaster, Pa.

Application November 30, 1956, Serial No. 625,446

1 Claim. (Cl. 248—131)

This invention relates to improvements in combination server stands and beverage container stand or server and has for its primary object to provide a rotatable tray which is rotatably supported in a raised horizontal position by its supporting means and which is provided with means to securely hold a spigot-type beverage container in a position for dispensing of the beverage from the container.

Another important object of the present invention is to provide a rotatable tray which is supported on a table by a supporting means, so that the tray is disposed above the table top and is rotatable and to provide adjustable means on the tray for clamping a spigot-type beverage container or jug thereon in a position so that the beverage can be dispensed from the spigot by anyone seated at the table.

Another important object of this invention is to provide a supporting means for supporting the tray in an elevated position above the table top so that large pitchers and the like may be placed on the table top and filled from the container, which is supported on the tray.

A still further object of this invention is to provide a simple, compact and study server tray, which, while particularly designed for holding a beverage container or jug, can be used as a serving tray for various items of food.

The foregoing and ancillary objects are attained by this invention, the preferred embodiment of which is set forth in the following description and illustrated in the accompanying drawing, wherein;

Figure 1 is a view in perspective of the server tray of the present invention;

Figure 2 is an enlarged vertical sectional view taken on line 2—2 of Figure 1; and Figure 3 is a transverse sectional view taken on line 3—3 of Figure 2.

Referring now more particularly to the accompanying drawing, the server 10 includes a circular tray or top 12, which has a flat upper surface 14. The tray 12 is formed with a depressed center section 16 that is attached to a supporting means 18.

The supporting means 18 includes a tubular housing 20, through which a bolt 22 axially passes. The center section 16 is provided with an aperture 24, that is centrally disposed, to receive the shank of the bolt and the head 26 of the bolt is recessed in the depressed center portion 16 of the tray. The tray is rotatably attached to the housing by means of the bolt and a washer 28, which is held on the bolt by a wing nut 30 that is threaded on the threaded end of the shank of the bolt 22. A tubular spacing sleeve 32 is provided and is disposed concentrically of the shank of the bolt and bears at its opposing ends on the underside of the depressed center portion 16 and the top side of the protruding center portion of the washer 28 with the circumferential rim portion of the washer seating the lower end of the housing 20. The sleeve is provided to space the center portion and the washer apart, as the wing nut is tightened on the bolt, whereby the center portion is not clamped tightly on the tubular housing 20 so that the tray 12 is free to rotate on the housing 20. Thus, the spacer sleeve prevents the wing nut from drawing the washer tightly against the tubular housing 20 so as to bind the housing with the underside of the tray. The tray is free to rotate, without any frictional interference.

The supporting means 18 also includes tubular supporting legs 34, which are arranged equidistantly about the tubular housing 20 and extend downwardly and outwardly therefrom at an angle of about thirty degrees. The upper ends 36 of the legs are flattened and are disposed parallel with the housing 20 and secured by screw fasteners 38 to the housing. The lower ends of the legs are provided with rubber tips 40.

Means is provided on the tray 12 for supporting various types of beverage containers or jugs, in an upright position, as shown in dotted lines in Figure 1 and Figure 2. Such means includes angular clips 42, which are disposed equidistantly about the tray and are arranged radially on the upper surface thereof. In this respect, the tray is provided with circumferentially spaced sets of series of radially disposed apertures 44. Each of the clips 42 includes a horizontal flange 46 and a vertical flange 48. The horizontal flange 46 is formed with a tapered vertical opening 50 in which the head 52 of a screw is seated, so that the head is flush with the upper surface of the horizontal flange. The shank of the screw is passed through one of the apertures in one of the series 44 and clamps the horizontal flange 46 tightly on the upper surface 14 of the tray by means of the wing nut 54. The horizontal flange 46 terminates at its outer end in a depending lug or finger 56, which is adapted to be fitted in one of the apertures 44 and is provided so as to prevent the clip from rotating about the screw. The vertical flanges 48 are slightly curved, so as to equally well conform to a flat or rounded side of a beverage container.

It can be seen that the clips 42 are disposed at equidistantly spaced points, circumferentially of the tray and are adjustable radially inwardly and outwardly from the center portion 16 of the tray, such adjustment being provided so that the clamping means can be used with various sizes of jugs or containers.

As shown in Figure 1, the beverage jug or container 58 is seated upright on the upper surface 14 of the tray and is provided with a side spigot that extends beyond the periphery of the tray, as shown in Figure 2. With the tray seated by supporting legs at the center of a table, it is obvious that the spigot will be accessible to anyone at the table, since the tray can be rotated to bring the spigot into easy reach of anyone at the table.

It can be seen that the supporting legs will support the tray in a horizontal position, elevated above the top of a table, so that large pitchers or the like can be placed on the table and inserted under the spigot while the server container is clamped on the tray.

While the preferred embodiment of this invention has been described and illustrated herein, other forms may be realized, as come within the scope of the appended claim.

What is claimed is:

A serving and supporting stand for a beverage jug having a side spigot, said stand comprising a flat horizontally disposed tray having upper and lower sides, clamp elements upstanding from the upper side to detachably engage the side wall of a jug and secure it on the upper side of the tray, means mounting said clamp elements on the tray in circumferentially spaced fashion and for adjustment radially of the tray so as to accommodate various sizes of jugs, an open ended tubular housing vertically disposed below the center of the under side of the tray, said center portion being apertured and depressed and fitted over the upper end of the housing and adapted to ride on and to close off said end, a washer fitted over the lower end, a bolt having its head seated on the upper side of the tray within the depressed portion and having its shank passed through the aperture and through the washer, a nut on the lower end of the bolt and bearing against the washer, a spacer sleeve circumposed in spaced fashion on the bolt within the housing to prevent the nut and washer from clamping the housing against the center portion so as to bind the tray against rotation and supporting legs fixed to the housing and arranged in tripod fashion to support the housing and tray on and spaced above a horizontal supporting surface so that a pitcher or the like can rest on such surface below the spigot.

References Cited in the file of this patent

UNITED STATES PATENTS

| | | |
|---|---|---|
| 668,522 | Jolly | Feb. 19, 1901 |
| 1,217,606 | Kane | Feb. 27, 1917 |
| 2,248,273 | Krajnc | July 8, 1941 |
| 2,679,996 | Rowe et al. | June 1, 1954 |